(12) United States Patent
Boundy (10) Patent No.: US 12,385,308 B2
(45) Date of Patent: Aug. 12, 2025

(54) SYSTEM AND DEVICES FOR ADJUSTABLE DOOR CLOSURE CONTROL

(71) Applicant: Moshun, LLC, Oak Brook, IL (US)

(72) Inventor: Tim J. Boundy, Deer Park, IL (US)

(73) Assignee: Moshun, LLC

( * ) Notice: Subject to any disclaimer, the term of this patent is extended or adjusted under 35 U.S.C. 154(b) by 779 days.

(21) Appl. No.: 17/555,753

(22) Filed: Dec. 20, 2021

(65) Prior Publication Data
US 2022/0112756 A1    Apr. 14, 2022

Related U.S. Application Data

(63) Continuation of application No. 16/502,470, filed on Jul. 3, 2019, now Pat. No. 11,866,977.
(Continued)

(51) Int. Cl.
| | |
|---|---|
| E05F 3/04 | (2006.01) |
| B23B 47/28 | (2006.01) |
| B23B 49/00 | (2006.01) |
| B23Q 17/22 | (2006.01) |
| E05F 5/02 | (2006.01) |
| F16F 9/52 | (2006.01) |

(52) U.S. Cl.
CPC ............... *E05F 3/04* (2013.01); *B23B 47/28* (2013.01); *B23B 49/005* (2013.01); *B23Q 17/2233* (2013.01); *E05F 5/02* (2013.01); *F16F 9/52* (2013.01); *E05Y 2900/132* (2013.01)

(58) Field of Classification Search
CPC .... E05F 3/04; E05F 5/02; B23B 47/28; B23B 49/005; B23Q 17/2233; F16F 9/52; E05Y 2900/132

USPC ................ 16/82, 85; 188/130, 290–295; 267/64.11, 120
See application file for complete search history.

(56) References Cited

U.S. PATENT DOCUMENTS

| | | | |
|---|---|---|---|
| 669,762 | A | 3/1901 | Peregrine |
| 1,041,223 | A | 10/1912 | Zuk |

(Continued)

FOREIGN PATENT DOCUMENTS

| | | |
|---|---|---|
| CN | 107083886 | 8/2017 |
| CN | 210087086 U | 2/2020 |

(Continued)

OTHER PUBLICATIONS

Advisory Action, U.S. Appl. No. 17/570,504, dated Aug. 28, 2023 (3 pages).

(Continued)

*Primary Examiner* — Christopher P Schwartz
(74) *Attorney, Agent, or Firm* — MCANDREWS HELD & MALLOY, LTD (57) ABSTRACT

Disclosed are systems and devices for controlling the closing of a door. A head unit is to be installed in a doorjamb, comprising a chamber filled at least in part with a shear thickening fluid. A piston is connected to a cap and configured to exert pressure against the shear thickening fluid in response to a force applied to the cap. The systems and devices provide an adjustable design that resists door slamming and aggressive closure, serving as a safety device as well as noise, damage and pet control around doors (preventing closure if desired). An install kit provides exact location, depth control and guide to place over the head unit to tap it into place with a hammer.

20 Claims, 8 Drawing Sheets

Related U.S. Application Data (60) Provisional application No. 62/694,762, filed on Jul. 6, 2018.

(56) References Cited

U.S. PATENT DOCUMENTS

| | | |
|---|---|---|
| 1,700,086 A | 1/1929 | Alonson |
| 1,704,217 A | 3/1929 | Rosenthal |
| 1,730,646 A | 10/1929 | Danner |
| 1,736,175 A | 11/1929 | Rosenthal |
| 1,965,806 A | 7/1934 | Riggins |
| 2,015,989 A | 10/1935 | Bommer |
| 2,127,327 A | 8/1938 | Millar |
| 2,695,807 A | 11/1954 | Bissot |
| 2,740,308 A | 4/1956 | Blanchard |
| 2,869,913 A | 1/1959 | Schlaage |
| 3,284,841 A | 11/1966 | Patriquin |
| 3,367,454 A | 2/1968 | Scherer et al. |
| 3,400,796 A | 9/1968 | Savins |
| 3,408,683 A | 11/1968 | Zahn |
| 3,487,494 A | 1/1970 | Baan |
| 3,537,126 A | 11/1970 | Nakanshi |
| 3,548,977 A | 12/1970 | Morgan |
| 3,952,365 A | 4/1976 | Grisebach |
| 3,958,673 A | 5/1976 | Alinquant et al. |
| 3,979,790 A | 9/1976 | Chiarappa |
| 4,452,437 A | 6/1984 | Lochner |
| 4,573,238 A | 3/1986 | Phillips |
| 4,590,639 A | 5/1986 | Fritsche |
| 4,658,468 A | 4/1987 | Tillmann |
| 4,829,628 A | 5/1989 | Vuksic |
| 5,078,552 A | 1/1992 | Albel |
| 5,082,317 A | 1/1992 | Delaney, Jr. |
| 5,152,029 A | 10/1992 | Pai et al. |
| 5,172,929 A | 12/1992 | Butsuen |
| 5,205,015 A | 4/1993 | Huang |
| 5,222,845 A | 6/1993 | Goldstein |
| 5,419,013 A | 5/1995 | Hsiao |
| 5,507,070 A | 4/1996 | Spyche, Jr. et al. |
| 5,529,154 A | 6/1996 | Tanaka |
| 5,579,874 A | 12/1996 | Jeffries et al. |
| 5,855,040 A | 1/1999 | Lin |
| 5,924,714 A | 7/1999 | Farris |
| 6,112,368 A | 9/2000 | Luckett |
| 6,237,959 B1 | 5/2001 | Hishon |
| 6,442,795 B1 | 9/2002 | Chen |
| 6,634,033 B2 | 10/2003 | Mizuno |
| 6,711,856 B1 | 3/2004 | Hoffman |
| 6,799,663 B2 | 10/2004 | Dubach |
| 6,824,335 B2 | 11/2004 | Lynch |
| 6,854,161 B2 | 2/2005 | Lee |
| 6,957,807 B2 | 10/2005 | Zimmer |
| 7,234,569 B2 * | 6/2007 | Salice ............... E05F 5/006 267/209 |
| 7,357,231 B2 | 4/2008 | Kim et al. |
| 7,410,154 B2 | 8/2008 | Lam et al. |
| 7,484,914 B1 | 2/2009 | Weinstein |
| 7,584,829 B2 | 9/2009 | Schmidt |
| 7,628,257 B1 | 12/2009 | Lu |
| 7,825,045 B1 | 11/2010 | Wagner |
| 7,845,050 B2 | 12/2010 | Pyo |
| 7,861,371 B2 * | 1/2011 | Kim ..................... E05F 5/10 16/85 |
| 7,918,167 B2 | 4/2011 | Tanielian |
| 7,975,994 B2 | 7/2011 | Born |
| 8,104,140 B2 | 1/2012 | Bassi |
| 8,123,005 B2 | 2/2012 | Bantle |
| 8,127,901 B1 | 3/2012 | Lu |
| 8,276,497 B2 | 10/2012 | Hunn |
| 8,348,028 B2 | 1/2013 | Zimmer et al. |
| 8,499,908 B2 | 8/2013 | Barker |
| 8,657,085 B2 | 2/2014 | Ogawa |
| 8,863,356 B2 | 10/2014 | Bacchetti |
| 8,925,695 B2 | 1/2015 | Rioja Calvo |
| 8,943,652 B2 | 2/2015 | Bacchetti |
| 8,966,712 B1 | 3/2015 | Yu |
| 9,127,493 B2 | 9/2015 | Zimmer et al. |
| 9,152,183 B2 | 10/2015 | Kurczewski |
| 9,217,485 B2 | 12/2015 | Wu |
| 9,303,709 B2 | 4/2016 | Manes |
| 9,360,076 B2 | 6/2016 | Svara et al. |
| 9,410,354 B2 | 8/2016 | Nakasone |
| 9,416,570 B1 | 8/2016 | Colombo et al. |
| 9,453,550 B2 | 9/2016 | Smith |
| 9,498,690 B2 | 11/2016 | Lorentz, Ii |
| 9,534,435 B2 | 1/2017 | Dora |
| 9,605,462 B2 | 3/2017 | Bacchetti |
| 9,682,605 B2 | 6/2017 | Ankney |
| 9,719,285 B2 | 8/2017 | Nagl et al. |
| 9,777,790 B2 | 10/2017 | Mizuno et al. |
| 9,890,574 B2 | 2/2018 | Kruedener |
| 9,920,563 B2 | 3/2018 | Löhken et al. |
| 9,970,831 B2 | 5/2018 | Shih |
| 10,017,082 B2 | 7/2018 | Zwaan |
| 10,041,560 B2 | 8/2018 | Ankney |
| 10,047,818 B2 | 8/2018 | Nakasone |
| 10,107,352 B2 | 10/2018 | Grzesik et al. |
| 10,145,162 B2 | 12/2018 | Liang et al. |
| 10,161,173 B2 | 12/2018 | Kruedener |
| 10,221,915 B2 | 3/2019 | Kull et al. |
| 10,246,924 B2 | 4/2019 | Hopkins |
| 10,258,146 B2 | 4/2019 | Hansen |
| 10,371,097 B2 | 8/2019 | Sellinger |
| 10,428,896 B2 | 10/2019 | Zimmer et al. |
| 10,443,678 B2 | 10/2019 | Galindo Rosales |
| 10,462,578 B2 | 10/2019 | Hoskins |
| 10,480,281 B2 | 11/2019 | Al-Oayan |
| 10,480,604 B2 | 11/2019 | Romano et al. |
| 10,557,513 B2 | 2/2020 | Pecar et al. |
| 10,570,935 B2 | 2/2020 | Koscielniak et al. |
| 10,580,231 B2 | 3/2020 | Lin |
| 10,626,651 B2 | 4/2020 | Chang |
| 10,633,905 B2 | 4/2020 | Feng |
| 10,677,309 B2 | 6/2020 | Ericksen et al. |
| 10,718,144 B2 | 7/2020 | Wang et al. |
| 10,829,975 B2 | 11/2020 | Wu |
| 10,837,213 B2 | 11/2020 | Talpe |
| 10,858,873 B2 | 12/2020 | Talpe |
| 10,865,597 B2 | 12/2020 | Chen et al. |
| 10,920,474 B2 | 2/2021 | Shinmura |
| 10,995,813 B2 | 5/2021 | Yamashita et al. |
| 11,008,794 B2 | 5/2021 | Chen |
| 11,041,335 B2 | 6/2021 | Chen |
| 11,053,722 B2 | 7/2021 | Teta et al. |
| 11,230,869 B2 | 1/2022 | Weber |
| 11,261,639 B2 | 3/2022 | Held |
| 11,268,589 B2 | 3/2022 | Zimmer et al. |
| 11,274,483 B2 | 3/2022 | Benedetti et al. |
| 11,344,955 B2 | 5/2022 | Majer |
| 11,465,218 B2 | 10/2022 | Degowske |
| 11,519,476 B2 | 12/2022 | Gross et al. |
| 11,536,344 B2 | 12/2022 | Kimishima et al. |
| 11,828,100 B2 | 11/2023 | Benedetti et al. |
| 11,828,308 B1 | 11/2023 | Lang et al. |
| 11,828,309 B1 | 11/2023 | Lang et al. |
| 11,841,065 B2 | 12/2023 | Boundy et al. |
| 11,866,977 B2 * | 1/2024 | Boundy ............. E05D 11/0009 |
| 12,025,206 B2 | 7/2024 | Boundy |
| 2002/0010977 A1 | 1/2002 | Salice |
| 2003/0155196 A1 | 8/2003 | Nishiyama |
| 2003/0200623 A1 | 10/2003 | Hung |
| 2003/0213663 A1 | 11/2003 | Salice |
| 2004/0068833 A1 | 4/2004 | Sawa |
| 2005/0034269 A1 | 2/2005 | Jinbo |
| 2006/0207843 A1 | 9/2006 | Migli |
| 2006/0278483 A1 | 12/2006 | Jiang |
| 2007/0041800 A1 | 2/2007 | Santos |
| 2007/0251052 A1 | 11/2007 | Pyo |
| 2009/0028691 A1 | 1/2009 | Huang |
| 2009/0119873 A1 | 5/2009 | Bassi |
| 2009/0236783 A1 | 9/2009 | Doffing et al. |
| 2009/0241287 A1 | 10/2009 | Reid |
| 2009/0241289 A1 | 10/2009 | Choi et al. |
| 2009/0272463 A1 | 11/2009 | Smith |

(56) References Cited

U.S. PATENT DOCUMENTS

| | | |
|---|---|---|
| 2010/0066051 A1 | 3/2010 | Haugen |
| 2010/0132161 A1 | 6/2010 | Vu |
| 2010/0162521 A1 | 7/2010 | Pyo |
| 2010/0170062 A1 | 7/2010 | Kim |
| 2010/0287729 A1 | 11/2010 | Jin |
| 2010/0319260 A1 | 12/2010 | Sawa |
| 2011/0127706 A1 | 6/2011 | Sims et al. |
| 2011/0253493 A1 | 10/2011 | Svara et al. |
| 2011/0283478 A1 | 11/2011 | Berry |
| 2012/0061194 A1 | 3/2012 | Yu |
| 2012/0233810 A1 | 9/2012 | Salutzki |
| 2013/0097805 A1 | 4/2013 | Bland |
| 2014/0033476 A1 | 2/2014 | Bacchetti |
| 2014/0319850 A1 | 10/2014 | Berger |
| 2014/0352111 A1 | 12/2014 | Ng |
| 2015/0040998 A1 | 2/2015 | Gilstad |
| 2016/0177611 A1 | 6/2016 | Rissone |
| 2016/0215552 A1* | 7/2016 | Löhken .............. F16F 9/483 |
| 2016/0238100 A1 | 8/2016 | Smith |
| 2016/0305156 A1 | 10/2016 | Kamody |
| 2017/0037669 A1 | 2/2017 | Kruedener |
| 2017/0096850 A1 | 4/2017 | Hopkins |
| 2017/0138433 A1 | 5/2017 | Wang et al. |
| 2017/0210458 A1 | 7/2017 | Tothill |
| 2017/0226682 A1 | 8/2017 | Duckworth |
| 2017/0304057 A1 | 10/2017 | Bichler |
| 2017/0350466 A1 | 12/2017 | Böhrer et al. |
| 2018/0010614 A1 | 1/2018 | Sellinger |
| 2018/0266512 A1 | 9/2018 | Zimmer |
| 2018/0328445 A1 | 11/2018 | Gilbert |
| 2018/0355945 A1 | 12/2018 | De Kock |
| 2019/0024748 A1 | 1/2019 | Rioja Iribarren |
| 2019/0040667 A1 | 2/2019 | Feng |
| 2019/0128362 A1 | 5/2019 | Naserimojarad |
| 2019/0330903 A1 | 10/2019 | Talpe |
| 2019/0371090 A1 | 12/2019 | Lin |
| 2019/0390496 A1 | 12/2019 | Bacchetti |
| 2020/0238780 A1 | 7/2020 | Dhaens |
| 2020/0240190 A1 | 7/2020 | Held |
| 2020/0299995 A1 | 9/2020 | Eolckhoff |
| 2020/0332581 A1 | 10/2020 | Balbo di Vinadio et al. |
| 2020/0408019 A1 | 12/2020 | Vos |
| 2021/0180381 A1 | 6/2021 | Wu |
| 2022/0010592 A1 | 1/2022 | Kirk |
| 2023/0039706 A1 | 2/2023 | Enders et al. |
| 2023/0123139 A1 | 4/2023 | Talpe |
| 2023/0146774 A1 | 5/2023 | Talpe |
| 2023/0295968 A1 | 9/2023 | Lee |
| 2023/0304342 A1 | 9/2023 | Boundy et al. |
| 2023/0304346 A1 | 9/2023 | Boundy et al. |
| 2023/0340823 A1 | 10/2023 | Buchalo et al. |
| 2023/0373014 A1 | 11/2023 | Block |

FOREIGN PATENT DOCUMENTS

| | | |
|---|---|---|
| DE | 202006006422 | 8/2006 |
| DE | 202006011846 | 12/2007 |
| DE | 102008014329 A1 | 9/2009 |
| GB | 2589152 A | 5/2021 |
| JP | 1998088899 A | 9/1998 |
| JP | H10331516 | 12/1998 |
| JP | 2003-266222 | 9/2003 |
| JP | 2004036885 A | 2/2004 |
| JP | 2004-353712 | 12/2004 |
| JP | 2009-531631 | 9/2009 |
| JP | 2014-118303 | 6/2014 |
| KR | 200165472 Y1 | 2/2000 |
| KR | 10-0337469 B1 | 5/2002 |
| KR | 200357306 | 7/2004 |
| KR | 100534373 | 12/2005 |
| KR | 20-2004-0018600 | 6/2006 |
| KR | 20070014713 A | 2/2007 |
| KR | 100777202 | 11/2007 |
| KR | 20170137390 | 12/2017 |
| KR | 102117780 B1 | 6/2020 |
| KR | 20220043582 | 4/2022 |
| WO | 2007/116273 | 10/2007 |
| WO | 2015/132254 A1 | 9/2015 |
| WO | 2020103458 A1 | 5/2020 |

OTHER PUBLICATIONS

United States Patent and Trademark, "Non-Final Office Action", issued in connection to U.S. Appl. No. 18/188,848, mailed Sep. 9, 2024, 10 pages.

United States Patent and Trademark, "Non-Final Office Action", issued in connection to U.S. Appl. No. 17/570,515, mailed Sep. 17, 2024, 7 pages.

United States Patent and Trademark, "Non-Final Office Action", issued in connection to U.S. Appl. No. 18/188,852, mailed Sep. 17, 2024, 13 pages.

Notification of Transmittal of the International Search Report and the Written Opinion of the International Searching Authority, or the Declaration, PCT/US2019/040533; Mailed on Jul. 4, 2022 (16 pages).

Non-Final Office Action, U.S. Appl. No. 17/570,504, dated Feb. 2, 2023 (8 pages).

Non-Final Office Action, U.S. Appl. No. 17/570,509, dated Jan. 5, 2023 (7 pages).

Non-Final Office Action, U.S. Appl. No. 18/188,853 dated Sep. 20, 2024 (56 pages).

Non-Final Office Action, U.S. Appl. No. 18/188,861 dated Sep. 20, 2024 (57 pages).

Non-Final Office Action, U.S. Appl. No. 18/188,859 dated Sep. 24, 2024 (58 pages).

Non-Final Office Action, U.S. Appl. No. 17/570,509 dated Jul. 18, 2023 (9 pages).

Non-Final Office Action, U.S. Appl. No. 17/555,738, dated Aug. 9, 2024 (69 pages).

Final Office Action, U.S. Appl. No. 17/570,504, dated Apr. 5, 2023 (13 pages).

Final Office Action, U.S. Appl. No. 17/570,509, dated Apr. 6, 2023 (11 pages).

Notification of Transmittal of the International Search Report and the Written Opinion of the International Searching Authority, or the Declaration, PCT/US23/16082; dated Aug. 24, 2023 (20 pagers).

Non-Final Office Action, U.S. Appl. No. 16/502,470, dated Aug. 23, 2023 (22 pages).

Notification of Transmittal of the International Search Report and the Written Opinion of the International Searching Authority, or the Declaration, PCT/US2019/040533, mailed Oct. 1, 2019 (11 pages).

United States Patent and Trademark Office, "Final Office Action", issued in connection with U.S. Appl. No. 17/555,738, dated Feb. 14, 2025, 38 pages.

United States Patent and Trademark Office, "Final Office Action", issue in connection with U.S. Appl. No. 18/188,848, dated Mar. 11, 2025, 25 pages.

United States Patent and Trademark Office, "Final Office Action", issue in connection with U.S. Appl. No. 18/188,859, dated Apr. 4, 2025, 26 pages.

United States Patent and Trademark Office, "Final Office Action", issue in connection with U.S. Appl. No. 18/188,861, dated Apr. 9, 2025, 31 pages.

United States Patent and Trademark Office, "Non-Final Office Action", issue in connection with U.S. Appl. No. 18/188,852, dated Apr. 10, 2025, 12 pages.

* cited by examiner

SYSTEM AND DEVICES FOR ADJUSTABLE DOOR CLOSURE CONTROL

RELATED APPLICATIONS

The present application is a continuation and claims the benefit of, and priority to, U.S. patent application Ser. No. 16/502,470, filed Jul. 3, 2019, and titled "Systems and Devices for Adjustable Door Closure Control," which claims the benefit of, and priority to, U.S. Provisional Application Ser. No. 62/694,762, filed Jul. 6, 2018, and titled "Adjustable Door Jamb Side Damper/Slam Control/Closure Control Device." The complete subject matter and contents of Application Ser. Nos. 62/694,762 and 16/502,470 are incorporated herein by reference in their entireties.

BACKGROUND

The slamming of a door can cause many problems. For instance, there is the risk that the door could be slammed on a person's fingers—often the fingers of a child. Additionally, slamming a door may result in a person or a pet being locked in a room. Moreover, nobody enjoys the loud sound of a slammed door. Therefore, there is a need for a device that can solve these problems.

Pressure at a doorjamb is extremely high. The ability to stop and/or control a forceful door closure with a device that allows normal closure when shut at gentle speeds, with the added benefit of being installed discretely in the jamb (i.e. in a small device barely visible when the door is closed) has not been accomplished before.

SUMMARY OF THE INVENTION

Certain embodiments of the present technology include a device that discretely controls a door slam and the closure speed of a door as well as provide a lock out so that the door will not close. The device is designed to intelligently react (e.g., with the ability to respond to varying situations and/or inputs by adjusting its' state or action) to a slam and/or aggressive door closure, yet does not hinder door closure when the door is closed slowly and more normally. The device is small, easily installed and, through the use of engineered materials (e.g., a smart, shear thickening fluid that reacts to forces applied to it, such as engineered polymeric compositions), reacts accordingly to the speed and pressure of a door closure. Thus, the reaction from the engineered material effectively responds to the user input intelligently. Accordingly, higher pressure and/or speed of the door swing results in more resistance by the device to closure, while lighter pressure and/or slower speed results in a more normal door closing experience. Also, adjustability of the device allows for more resistance more quickly as well as full lock out capability, such that the door will not be able to close.

The foregoing summary, as well as the following detailed description of certain embodiments of the present invention(s), will be better understood when read in conjunction with the appended drawings. For the purpose of illustrating the invention(s), there is shown in the drawings, certain embodiments. It should be understood, however, that the present invention(s) is not limited to the arrangements and instrumentality shown in the attached drawings.

DETAILED DESCRIPTION OF THE INVENTION

Figure 1:
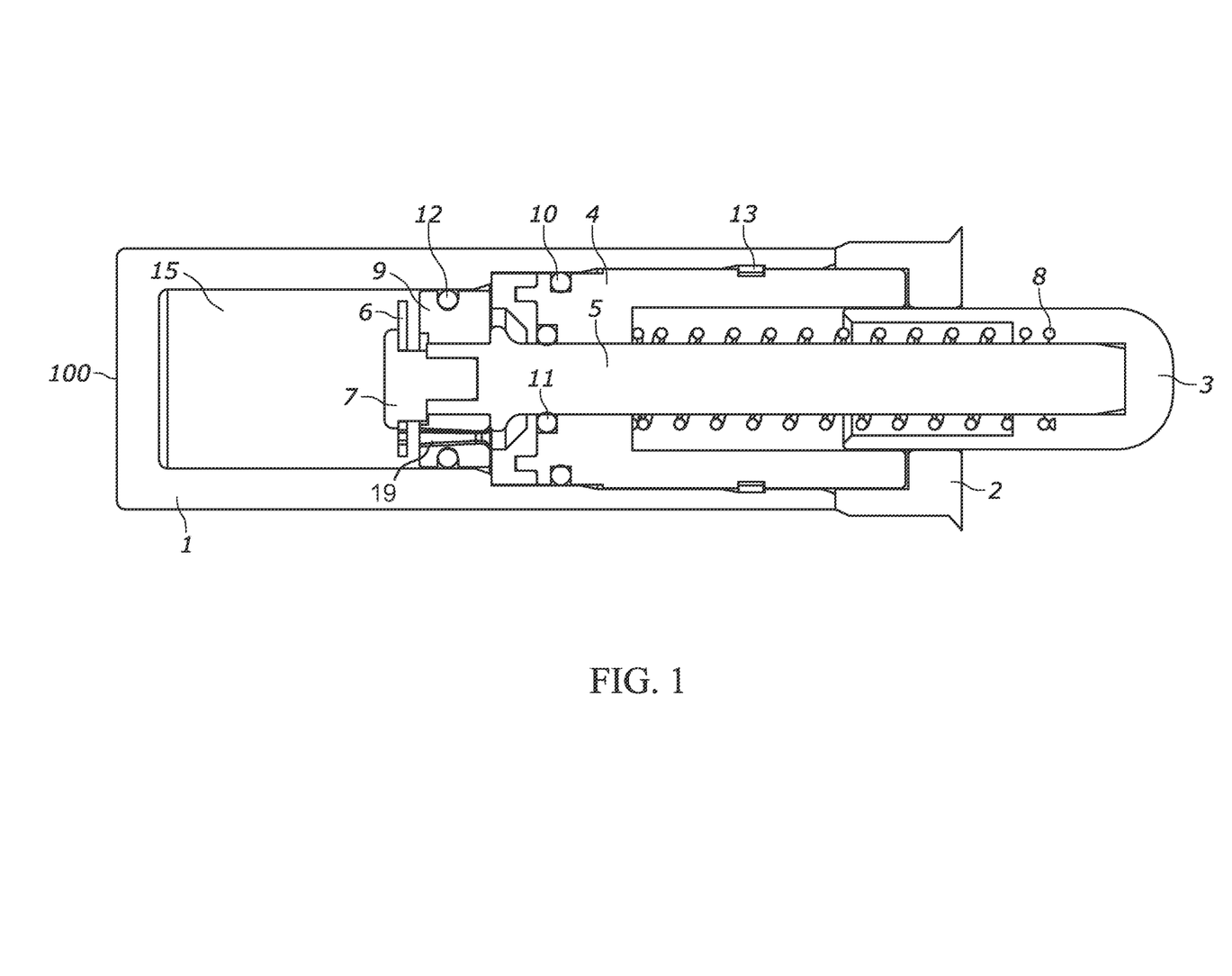
FIG. 1 is a cross-sectional side view of an example unit according to an embodiment of the present invention.

In some examples of the disclosed system, a head unit 100 is defined as a generally cylindrical device as shown in FIG. 1, with adjustable valving filled to a specific volume within a channel 15 with a shear thickening fluid (or dilatant fluid), the device assembled to resist leakage or disassembly. In operation, the system has at least two parts—the head unit 100 (shown in FIG. 1) and a strike 14 (shown in FIG. 2).

Figure 2:
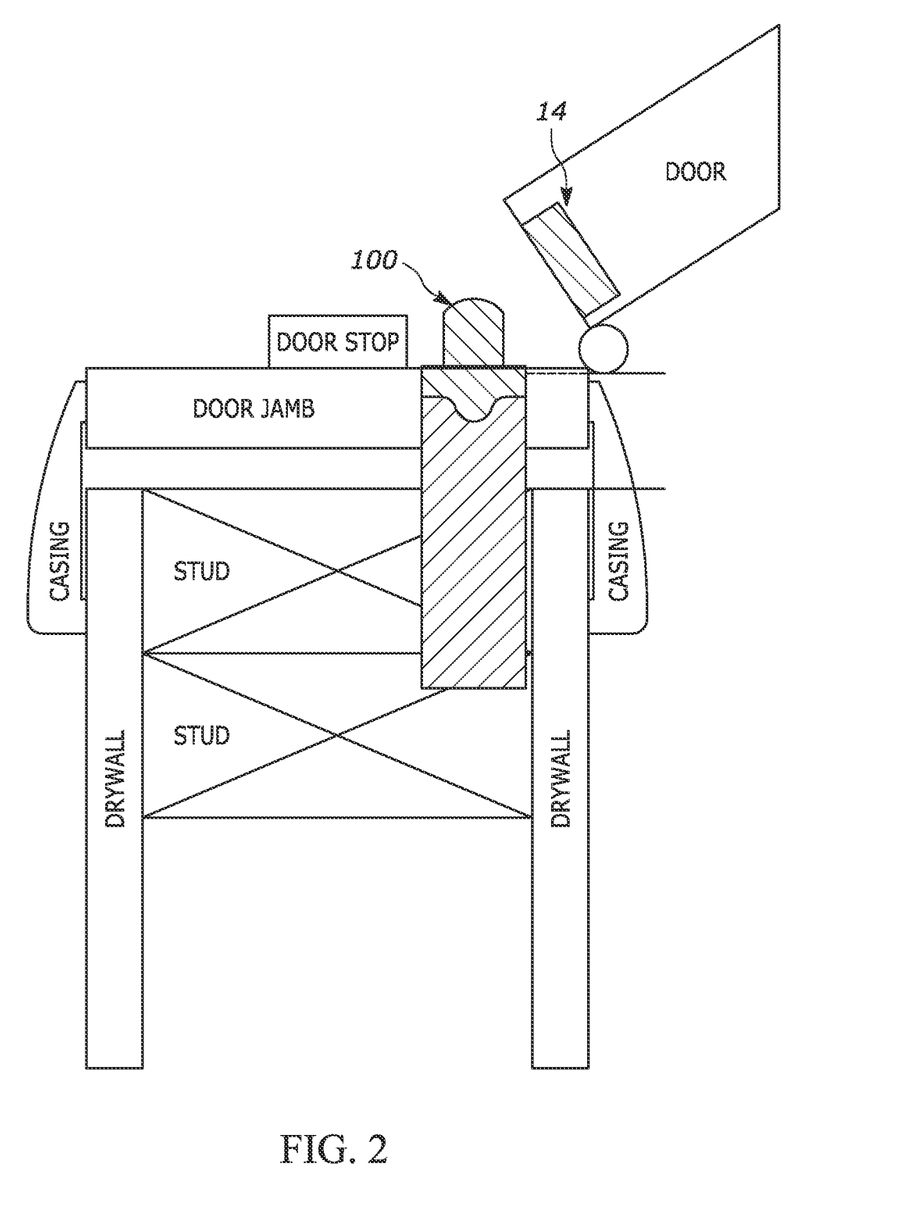
FIG. 2 is a cross-sectional top view of an example head unit and strike installed in a doorjamb and door, respectively, according to an embodiment of the present invention.

The head unit 100 is installed in, by way of example, a hole with a diameter of $^{15}/_{16}$" and 3" deep that is drilled into the jamb side of the door above or below, for example, the middle hinge. This effectively leaves a blind 3" hole with enough framing support to carry the pressure of the door closure. The head unit 100 can be installed with an install kit including an install tool or guide 20, disclosed with respect to FIGS. 6 through 8. As shown in FIG. 1, the strike 14 is installed into, by way of example, a hole with a diameter of $^{15}/_{16}$" and ½" deep, which is drilled into the door edge (e.g., the jamb side) to provide a contact point for a plunger cap 3 of the head unit 100, as shown in FIG. 2.

As disclosed herein, shear thickening fluid, provides the "brains" that allow a slotted piston head 9 with an adjustable shim stack style valve to close onto the piston head 9 resulting in a controlled close. Shear thickening fluid (or dilatant material) is a Non-Newtonian fluid that stiffens when acted upon by pressure and/or speed. For example, the greater the speed and/or pressure, the stiffer the fluid becomes. When the speed and/or pressure is light, the fluid is flowable. When the speed and/or pressure is higher, it begins to act more like a solid. These phenomena combined with adjustable and accurate valving allows the desired reaction in preventing unwanted door slamming, preventing loud door closures and door vibrations upon closure (e.g., since the plunger cap 3 applies a slight back pressure to the door edge).

Example components of an embodiment of the present technology are as follows:
  The Head Unit or Adjustable Assembly 100 (shown in FIG. 1)
  The components of the Head Unit 100 are as follows:
  Hydraulic Chamber (1) (shown in FIG. 1)
  Jamb Collar (2) (shown in FIGS. 1 and 5)
  Plunger Cap (3) (shown in FIG. 1)

Plunger Bushing One Piece (4) (shown in FIG. 1)
Shear Thickening Fluid Plunger (5) (shown in FIG. 1)
Rebound Shim (6) with Slots (18) (shown in FIGS. 1 and 3)
Rebound Guide Plug (7) (shown in FIGS. 1 and 4A-4C)
Spring (8) (shown in FIG. 1)
Shear Thickening Fluid Piston Head (9) with Slots (19) (shown in FIGS. 1 and 5)
Hydraulic Chamber O-Ring (10) (shown in FIG. 1)
Plunger Rod O-Ring (11) (shown in FIG. 1)
Shear Thickening Fluid Piston Slots (Piston Head) O-Ring (12) (shown in FIG. 1)
Retaining Ring (13) (shown in FIG. 1)
The system also includes a Strike (14) (shown in FIG. 2) and Shear Thickening Fluid (15) (shown in FIG. 1).

Relationship Between the Components:

As shown in FIG. 1, a plunger 5 is inserted, (non-flange end) through, by way of example, a 0.25" hole in a plunger bushing one piece 4. A spring 8 is inserted into a larger diameter cavity in the plunger bushing one piece 4. The plunger cap 3 is inserted onto the non-flange end of the plunger 5 with the spring 8 settling into a cavity of the plunger cap 3. The piston head 9 is placed on the flange side of the plunger 5, and the rebound guide plug 7 is inserted into the drilled hole in the flange end of the plunger 5. This whole sub-assembly is then pressed together and the rebound guide plug 7 and plunger 5, and plunger 5 and plunger cap 3 engage at press-fit tolerance interfaces to become assembled. A retaining ring 13 is placed onto an upper groove of the plunger bushing one piece 4 closest to plunger cap 3, a hydraulic chamber O-ring 10 is placed into a lower groove of the plunger bushing one piece 4 closest to the piston head 9, and a piston slot O-ring 12 is placed onto a groove in piston head 9. This resulting device is hereafter referred to as the Subassembly.

The hydraulic chamber 1 is filled with shear thickening fluid 15. By way of example only, approximately 7.5 grams of the shear thickening fluid 15 may be used. The volume that contains the shear thickening fluid 15 is hereinafter referred to as the Hydro Chamber.

The Subassembly can then be inserted into the Hydro Chamber vertically. The retaining ring 13 is squeezed to allow it to enter the Hydro Chamber, and then the Subassembly is pressed in until retaining ring 13 snaps into place into a groove in the interior of the hydraulic chamber.

The jamb collar 2 is then placed on the plunger bushing one piece 4 aligning the tabs on jamb collar 2 with the recesses on the hydraulic chamber 1 and pressed in place.

The resulting device is the head unit 100 and it is a permanent assembly.

Figure 6:
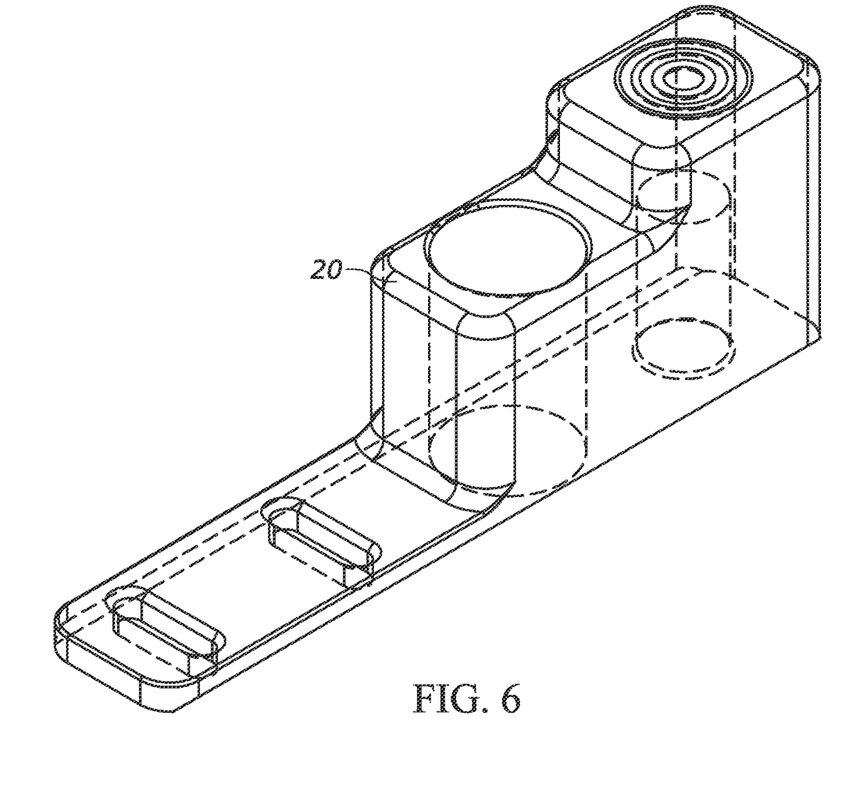
FIG. 6 is an isometric view of an example install guide according to an embodiment of the present invention.
Figure 7:
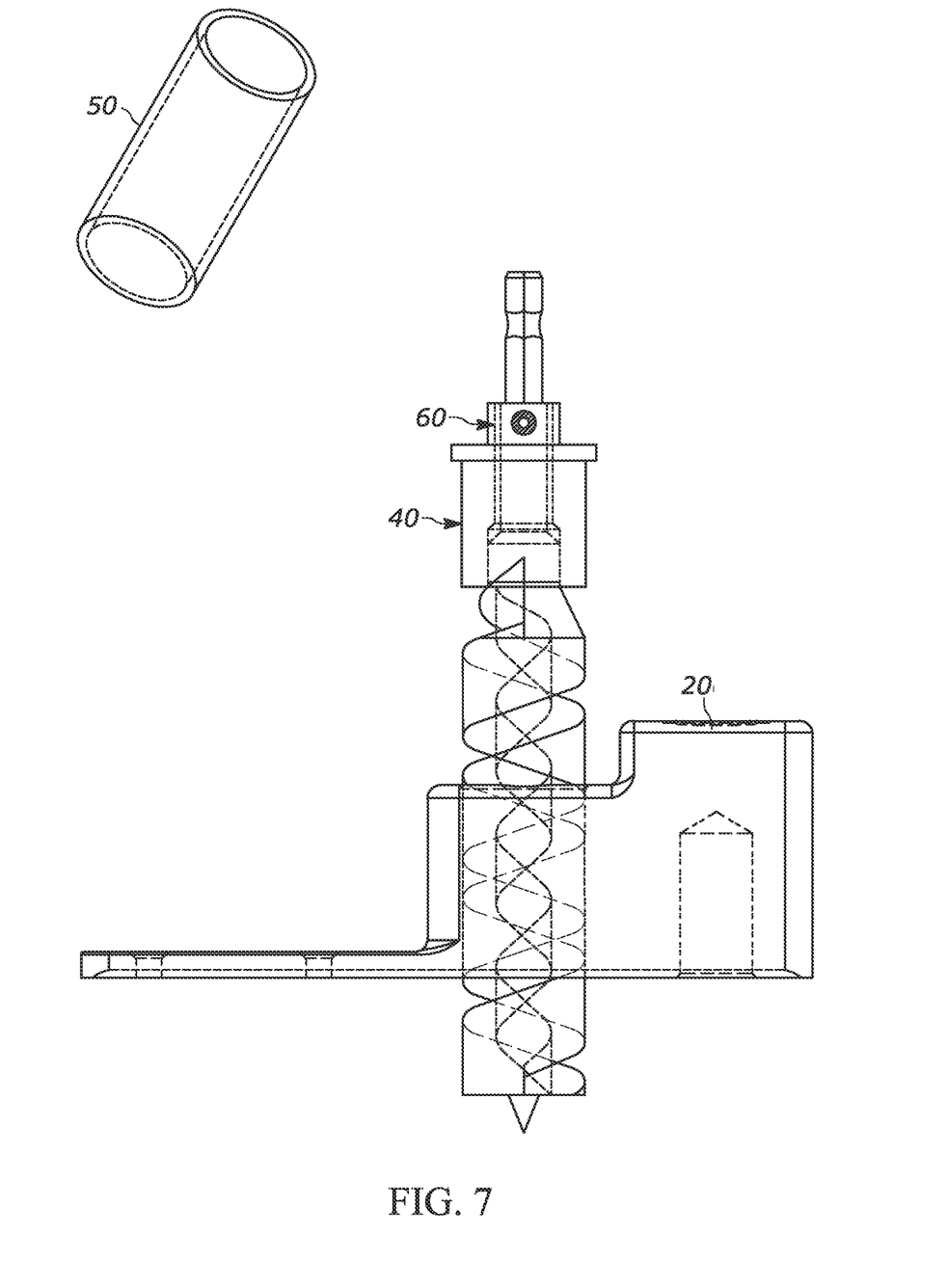
FIG. 7 shows a cutaway view of the install guide of FIG. 6 and a drill sleeve.
Figure 8:
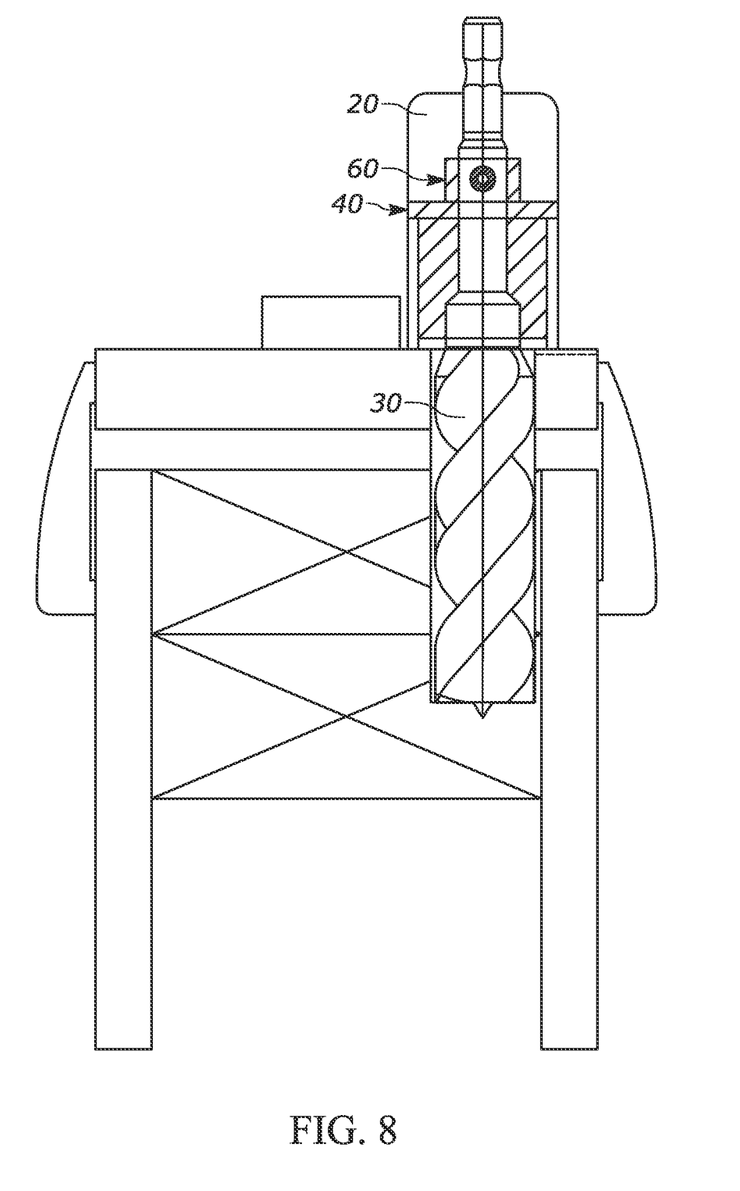
FIG. 8 is a cross-sectional top view of the install guide of FIG. 6 in a doorjamb according to an embodiment of the present invention.

Once assembled, the Head Unit 100 can be lightly hammered into a drilled hole in the jamb side of the door, such as by employing an install guide 20, which is discussed further with respect to FIGS. 6 through 8.

The strike 14 (shown in FIG. 2) can be lightly hammered into a drilled hole on the door edge side. Drilling of this hole is also done by use of the install guide 20. However, in some examples, the plunger cap 3 can contact the door directly without the use of a strike while retaining the benefits of the systems and devices disclosed herein. Additionally or alternatively, a strike can be configured with a recessed cavity rather than a flat surface, such that the plunger cap 3 is inserted into the cavity before making contact with the strike. In some examples, a strike may be a plate on the surface of the door edge opposite the plunger cap 3.

The Operation of the Head Unit 100 and Strike 14

As shown in FIG. 2, the head unit 100 is inserted into a hole drilled into the jamb side by tapping (lightly hammering) the head unit 100 into the cavity with the install kit. The strike 14 is inserted into the door edge by tapping (lightly hammering) the strike 14 into place in the drilled hole. When the door is closed, the plunger cap 3 of the head unit 100 contacts the edge of the door, such as at the strike 14, which depresses the plunger cap 3 such that the plunger cap 3 pushes against the plunger 5 and spring 8 and such that plunger 5 is pushed through plunger bushing 4. That action leads to piston head 9 and shim 6 on guide plug 7 moving with respect to fluid 15. Fluid 15 reacts to the force and speed of that impact and stiffens up accordingly or remains flowable depending on the force applied.

Figure 3:
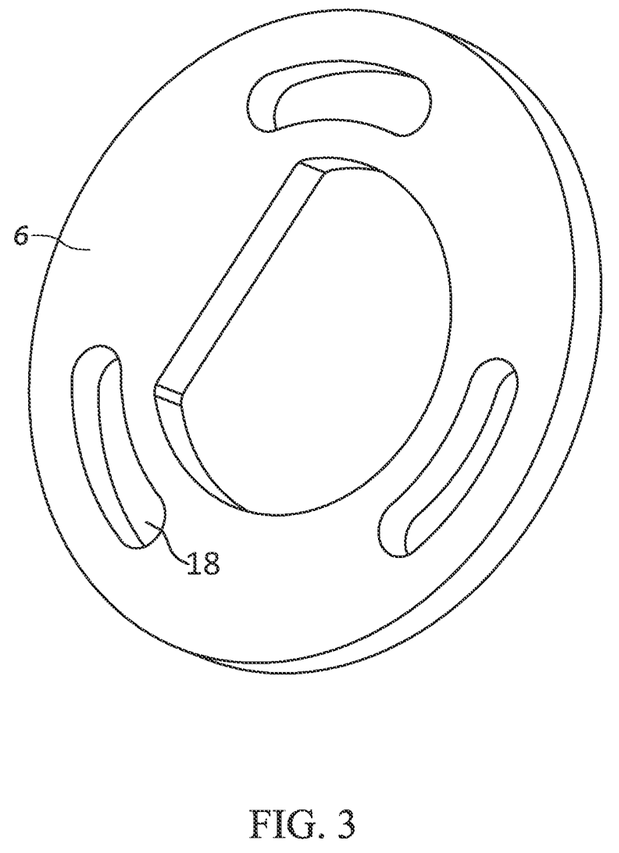
FIG. 3 is an isometric view of an example rebound shim with slots according to an embodiment of the present invention.
Figure 4A:
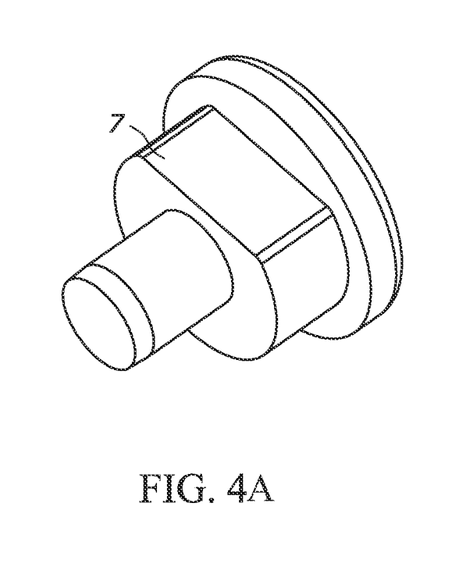
FIGS. 4A-4C are isometric views of an example rebound guide plug according to an embodiment of the present invention.
Figure 4B:
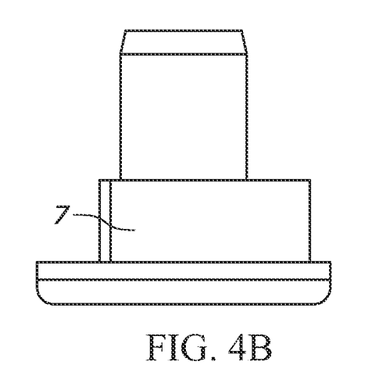
Figure 4C:
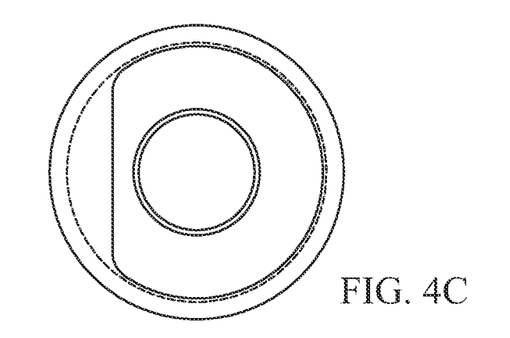
Figure 5:
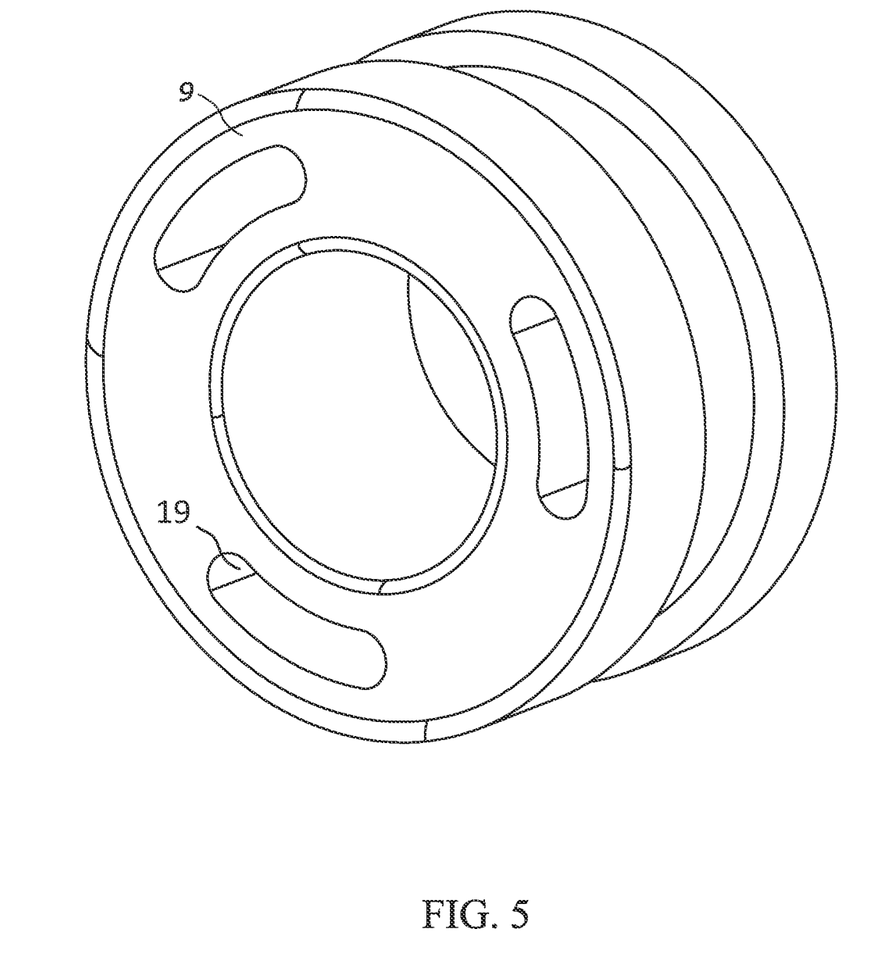
FIG. 5 is an isometric view of an example shear thickening fluid piston head with slots according to an embodiment of the present invention.

In some examples, shim 6 has one or more slots 18 that generally match one or more slots 19 through piston head 9 in one or both of size and/or shape. The ability of the fluid 15 to resist the force of the depressed plunger cap 3 (and thus control the speed and/or force of the door closure) depends on the alignment of the slots 18 of the shim 6 and the slots 19 of the piston head 9. Piston head 9 has a stop built into it such that guide plug 7 contacts in both the left and right rotations to adjust the amount of fluid 15 compression. For example, if the slots 18 on shim 6 have been rotated to the left (e.g., by the user via a simple turn of plunger cap 3), then the slots 18 on shim 6 will not align with the slots 19 in piston head 9 and, thus, the fluid 15 will resist the movement of the piston 5 and the plunger cap 3, and the plunger cap 3 will not depress and the door will not close (i.e. partially, completely, and/or more slowly, depending on the resulting alignment).

If, however, the slots 18 on the shim 6 have been rotated to the right, and are aligned with the slots 19 on the piston head 9, then the fluid 15 flows more easily between the shim 6 and piston head 9 and does not resist movement of the plunger 5 and cap 3 as much. Thus, the compression of the fluid 15 is at its lightest setting. The reactivity to force of fluid 15, however, still lets the device control the speed of closure due to the stiffening effect of the material make-up (e.g., a polymeric material) of the fluid 15. Fluid 15 also serves to control, in combination with the selection of the spring rate of spring 8, the return force from cap 3 so that it does not push the door open or allow the door to aggressively bounce back at the user. In some examples, the force on the door from cap 3 can be adjusted to a desired level to provide for a controlled opening by gently pushing the door open, such as by unlatching the door (either remotely, electronically, manually or otherwise).

The shim 6 is rotatable such as by a user (and thus the position of the slots 18 in the shim 6 with respect to the slots 19 in the piston head 9) by rotating the plunger cap 3. The plunger cap 3 is tightly fitted to the plunger 5, which is tightly fitted to the guide plug 7, which is tightly fitted to the shim 6. Therefore, rotation of the plunger cap 3 causes the plunger 5 to rotate, which in turn causes the guide plug 7 to rotate, which in turn causes the shim 6 to rotate, allowing adjustment of the amount of compression (i.e. resistance) experienced during closure.

As disclosed with respect to the figures, the slots 19 of piston head 9 are pitched with the wider part of the opening facing the fluid 15 and the narrower part on the backside of the piston head 9 such that the slots 19 are substantially "V" shaped. The shear thickening fluid 15 stack up (stiffen) as the piston 5 pushes through the fluid 15 upon the closing/slamming of a door closure. In some disclosed examples, the shear thickening fluid 15, as engineered, has nanoparticles of a specific dimension that are mixed in a non-toxic carrier fluid or solvent. Force applied to the shear thickening fluid 15 results in these nanoparticles stacking up, thus stiffening and acting more like a solid than a flowable liquid. Examples of shear thickening fluid are disclosed in U.S. Pat. No. 7,825,045, which is incorporated herein in its entirety by reference.

The particles of shear thickening fluid 15 may be, by way of example, oxides, calcium carbonate, synthetically occurring minerals, naturally occurring minerals, polymers, or a mixture thereof. The particles may also be, by way of example, $SiO_2$, polystyrene, or polymethylmethacrylate. The solvent may be, by way of example, water, which may contain salts, surfactants, and/or polymers. The solvent may also be, for example, ethylene glycol, polyethylene glycol, ethanol, silicon oils, phenyltrimethicone or a mixture thereof. In some examples, the particles may have an average diameter size that is less than 1 millimeter, and may have an average diameter size of less than 100 microns. By way of example, the shear thickening fluid 15 may be made of silica particles suspended in polyethylene glycol. By further way of example, silica particles may suspended in the polyethylene glycol at a volume fraction of approximately 0.57. The silica particles may have an average particle diameter of approximately 446 nm. The fluid may have a shear thickening transition at a shear rate of approximately 102-103 s−1.

Again, a simple rotation of the plunger cap 3 allows the user to control the valve sensitivity based on the feel they want when closing the door. Turning left to the stop locks out the device so that that door cannot be closed at all—even gently—because the shim 6 attached to the piston head 9 completely blocks the slots 19 of the piston head 9 from allowing any shear thickening fluid to pass through. Turning the plunger cap 3 to the right allows the device to let the door be closed normally (i.e., gently closed and not slammed) because the slots 18 on the shim 6 are generally aligned with the slots 19 on the piston head 9, allowing the fluid to pass through. However, the fluid still reacts to speed and pressure. Therefore, the system still controls the door closing to resist a slam.

The shim 6 is held in place by a cylindrical stainless steel rebound plug 7, with a flat section (shown in FIGS. 4A-4C) that fits into a "D" shape in the shim 6 (shown in FIG. 3), keeping it in position for the user adjustment and alignment of its slots 18 with the piston head 9 slots 19. The shim 6 floats on the rebound plug 7, such that the shim 6 is not in a fixed position in the direction of the plunger 5. Thus, during door closure, the shim 6 presses against the piston head 9 when the shear thickening fluid 15 is being compressed, and pulls away from the piston head 9 on rebound of the door, allowing the piston head 9 slots 19 to be fully open. The piston head 9 is attached to the plunger 5 that is attached to the plunger cap 3 (the plunger cap 3 is the component that contacts the strike 14 on the door edge). The spring 8 returns the plunger 5 to its fully extended position with the combination of the selected spring rate and the engineered shear thickening fluid 15 controlling the rate of return, thus not allowing a spring-back effect. The plunger bushing one piece 4 serves as a guide for the plunger 5 and the plunger cap 3, and as a stop for the spring 8. The plunger bushing one piece 4 has one or more grooves for at least O-rings 10 and 11 used to seal the hydraulic chamber 1 as well as the plunger rod/bushing interface.

With reference to FIG. 1, the jamb collar 2 is slip fitted onto the outermost section of the one-piece plunger bushing 4 that protrudes from the hydraulic chamber 1. The exterior or "face" of jamb collar 2 becomes flush with the jamb edge when the head unit 100 is inserted and tapped (lightly hammered) into the drilled hole in the doorjamb that receives the head unit 100.

This jamb collar 2 component function is three-fold. First, the jamb collar 2 holds the device securely in the doorjamb. Second, being slip fit on the bushing 4 gives the remainder of the device that is inside the doorjamb framing the ability to be disconnected from the doorjamb itself (because it is free to move slightly fore-aft inside the jamb collar), thus not pulling on the jamb millwork and stressing/flexing the jamb and hinges. And third, the jamb collar 2 is a finished face to the drilled hole where the head unit 100 is inserted.

When the door closes, the plunger cap 3 (jamb side) contacts the strike 14 (door edge side) and functions as described above. The strike 14 may be manufactured from one or more engineered materials, such as polymers and/or thermoplastics with high stiffness and stability and low friction. In some examples, polyoxymethylene (such as Delrin or Acetyl), due to its hard, tough composition combined with a lubricity function, is a suitable material for a strike 14. For example, the composition allows the plunger cap 3 to contact and slide against the strike 14, yet without catching or sticking to the surface during door closure.

Thus, as explained herein, the disclosed technology provides a way to control door slamming and closure. Advantageously, it can protect fingers from door slams (toddlers, young children), prevent unwanted aggressive door closures such as those done by teenagers or adults hastily closing doors, and prevent wind driven door slams. It can prevent a door from closing on pets, toddlers, or the elderly, who may have a tendency to accidentally close a door, locking themselves in a room.

This can all be accomplished by the very small head unit and/or strike device, which are installed into the hinge side of the doorjamb and door edge, respectively.

Below is a list of non-limiting examples of materials and/or manufacturing techniques from which certain components of the disclosed technology can be made.
1. Hydraulic Chamber—CNC machined from aluminum
2. Jamb Collar—Molded from Delrin (Acetyl) or CNC from aluminum
3. Plunger Cap—CNC from Stainless Steel
4. Plunger Bushing One Piece—Molded from Delrin (Acetyl) or CNC machined from Delrin (Acetyl)
5. Shear Thickening Fluid Plunger—CNC Machined from Stainless Steel
6. Rebound Shim—Stamped from Delrin (Acetyl) or Molded from Delrin (Acetyl)
7. Rebound Guide Plug—CNC Machined from Stainless Steel
9. Shear Thickening Fluid Piston Slots (Piston Head)—Molded from PEEK
14. Strike—Molded from Delrin (Acetyl)

The Structure and Operation of the Install Kit/Guide

The disclosed technology also includes an installation kit, shown in FIGS. 6 through 8, which can be used to install the head unit 100 and/or strike 14 into a jamb and door edge, respectively. The install tool assists in exactly locating the position of both the head unit 100 on the jamb and the strike 14 on the jamb side door edge, as well as controlling the depth of the drilled cavities into which the head unit 100 and strike 14 are installed.

The install kit includes an install guide 20 (shown in FIGS. 6 through 8 and which can be molded from materials such as Delrin/Acetyl), a drill bit 30 (shown in FIGS. 7 and 8) (alternative bits can also be employed), and the drill bit 30 bushing can be revised to fit alternative bits), a drill bit bushing 40 (which can be molded or CNC machined from materials such as Delrin (Acetyl)), a drill sleeve 50 (which can be CNC machined from PVC Rod or Delrin Rod), and/or a locking collar 60 (shown in FIG. 8).

Using the install guide 20, a user can drill the two holes required for the head unit 100 and the strike 14 and then insert the head unit 100 into the jamb and insert the strike 14 into the jamb side of the door. A user can then adjust the head unit 100 as desired by turning plunger cap 3 left or right or in between as desired to control door closure and react to speed and pressure of closure. At lower speed and pressure, the closing door meets less resistance from the head unit 100 and the door closes easily, whereas at higher speed and pressure the head unit 100 stiffens up and controls the slam.

In operation, the install kit is used as follows. To drill a hole for the head unit 100 in the doorjamb, a screw is removed from a hinge and placed into a screw slot in the guide 20 and tightened back up in the hinge screw hole with the tool/guide 20 held tightly to the edge of the doorjamb stop to stabilize the guide 20 on the jamb and locate the hole to be drilled for the head unit 100. The bushing 40 is placed on the bit 30 and held in place by the collar 60, which is tightened with a set screw on the collar 60. The install kit can come with bushing 40 and collar 60 already installed on bit 30. This is called the Drill Bit Assembly. Using a power drill with the Drill Bit Assembly installed, the user can drill into the jamb edge through, by way of example, an approximately 0.950 inch hole in the guide 20. The assembly of the drill bit 30, guide 20, collar 60, and bushing 40 is shown in FIG. 8. When the Drill Bit Assembly's drilling is stopped by the flange on the bushing 40 contacting the top of the guide 20, the Head Unit hole drilling is complete. The drilling process for the doorjamb using the guide 20 is illustrated in FIG. 8. The guide 20 is then removed from the jamb by removing the screw holding it in place.

In some examples, the screw from the matching location on the other half of the hinge on the door edge side is removed and the guide 20 is centered on the door edge and the screw is used to secure the guide 20 to the door edge. Drill sleeve 50 can then be put onto the drill (from the cutting side) and slid up until it contacts the flange on the bushing 40. The process of drilling into the door edge is then similar to that described in drilling the jamb side for the head unit 100, however the drill sleeve 50 will now contact the guide 20 when the drilling is complete, creating a, for example, ½" cavity in the door edge for the strike to be installed.

The head unit 100 is now pushed into the hole in the jamb and the blind hole in the bottom of the guide 20 is placed over the plunger cap 3 of the head unit 100. The head unit 100 is then lightly hammered into the jamb by tapping on the most raised portion of the guide 20. When completed, the head unit jamb collar 2 is flush with the jamb and the head unit 100 is securely installed in the doorjamb. The strike is then lightly hammered into the cavity on the door edge side, securing it in place. This install guide 20 assists in aligning the drilled holes on the door edge and on the jamb with each other when the door is closed, such that the head unit 100 and the strike 14 line up with each other when installed. The install guide 20 also helps in making sure that the depth of the drilled holes is correct so that the head unit 100 is level and at the corrected depth when installed and that the strike 14 is level and at the correct depth when installed. In an alternate embodiment, the strike 14 can be installed in the jamb and the head unit 100 can be installed in the door edge.

It is to be understood that the invention is not limited in its application to the details of construction and the arrangement of the components set forth in the description or illustrated in the drawings. The invention is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

While various spatial and directional terms, such as top, bottom, lower, mid, lateral, horizontal, vertical, front and the like may be used to describe embodiments of the present invention, it is understood that such terms are merely used with respect to the orientations shown in the drawings. The orientations may be inverted, rotated, or otherwise changed, such that an upper portion is a lower portion, and vice versa, horizontal becomes vertical, and the like.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention.

The invention claimed is:

1. A device for controlling the motion of an object, comprising:
 a head unit that includes a chamber filled at least in part with a shear thickening fluid;
 a plunger in the head unit that is connected to a cap and a piston head, the piston head having at least one slot and being positioned in the chamber of the head unit;
 a shim that includes a D-shaped hole and at least one slot; and
 a plug having a D-shaped portion that is received in the D-shaped hole of the shim such that the shim does not rotate with respect to the plug and an end portion that is connected to the plunger;
 wherein the piston head and shim are configured to both move axially in the chamber with respect to the shear thickening fluid in response to a force applied to the cap by an object and wherein the shim is configured to be rotated with respect to the piston head.

2. The device of claim 1, wherein the at least one slot is located between the D-shaped hole and an outer edge of the shim.

3. The device of claim 1, wherein the piston head receives a portion of the plunger and engages a flange on the plunger.

4. The device of claim 1, wherein the plunger, plug, and shim are rotatable with respect to the piston head.

5. The device of claim 1, wherein the shim is axially movable along the D-shaped portion of the plug and with respect to the piston head and contacts the piston head when the piston head is caused to move axially in the chamber with respect to the shear thickening fluid in response to a force applied to the cap.

6. The device of claim 1, wherein the plug includes a base to which the D-shaped portion is connected, the based being configured to resistably engage the shim.

7. The device of claim 1, wherein a portion of the D-shaped portion of the plug is received in the piston head and is rotatable with respect to the piston head.

8. The device of claim 7, wherein the piston head has a first stop that prevents the D-shaped portion from being rotated beyond a first point in a first direction and a second stop that prevents the D-shaped portion from being rotated beyond a second point in a second direction.

9. The device of claim 1, wherein the at least one slot of the piston head is pitched such that a wider opening faces the shear thickening fluid and a narrower opening is on a backside of the piston head.

10. The device of claim 1, wherein the at least one slot of the shim has an opening shape and size approximately equal to an opening shape and size of the at least one slot of the of the piston head.

11. The device of claim 1, wherein rotation of the rebound shim to a first position with respect to the piston head substantially aligns the at least one slot of the rebound shim with the at least one slot of the piston head, and rotation of the rebound shim to a second position with respect to the piston head substantially misaligns the at least one slot of the rebound shim with the at least one slot of the of the piston head.

12. A device for controlling the motion of an object, comprising:
  a head unit that includes a chamber filled at least in part with a shear thickening fluid;
  a plunger in the head unit that is connected to a cap,
  a bushing and a spring in the head unit, wherein the spring is configured to provide mechanical resistance between the cap and the bushing in response to a force applied to the cap;
  a piston head connected to the plunger and positioned in the chamber of the head unit, the piston head having at least one slot;
  a shim that includes a D-shaped hole and at least one slot; and
  a plug having a D-shaped portion that is received in the D-shaped hole of the shim such that the shim does not rotate with respect to the plug and an end portion that is connected to the plunger;
  wherein the piston head and shim are configured to both move axially in the chamber with respect to the shear thickening fluid in response to a force applied to the cap by an object and wherein the shim is configured to be rotated with respect to the piston head.

13. The device of claim 12, wherein the bushing comprises a cavity fluidly isolated from the chamber, and the cap is configured to move into the cavity in response to the force.

14. The device of claim 12, wherein the piston head receives a portion of the plunger and engages a flange on the plunger.

15. The device of claim 12, wherein the at least one slot is located between the D-shaped hole and an outer edge of the shim.

16. The device of claim 12, wherein a portion of the D-shaped portion of the plug is received in the piston head and is rotatable with respect to the piston head.

17. The device of claim 16, wherein the piston head has a first stop that prevents the D-shaped portion from being rotated beyond a first point in a first direction and a second stop that prevents the D-shaped portion from being rotated beyond a second point in a second direction.

18. A device for controlling the motion of an object, comprising:
  a head unit that includes a chamber filled at least in part with a shear thickening fluid;
  a plunger in the head unit that is connected to a cap,
  a bushing and a spring in the head unit, wherein the plunger extends through the bushing and spring, and the spring is configured to provide mechanical resistance between the cap and the bushing in response to a force applied to the cap;
  a piston head that receives a portion of the plunger, engages a flange on the plunger, and that is positioned in the chamber of the head unit, the piston head having at least one slot;
  a shim that includes a D-shaped hole and at least one slot; and
  a plug having a D-shaped portion that is received in the D-shaped hole of the shim such that the shim does not rotate with respect to the plug and an end portion that is received in the plunger;
  wherein the piston head and shim are configured to both move axially in the chamber with respect to the shear thickening fluid in response to a force applied to the cap by an object and wherein the shim is configured to be rotated with respect to the piston head.

19. The device of claim 18, wherein the bushing comprises a cavity fluidly isolated from the chamber and the cap is configured to move into the cavity in response to the force.

20. The device of claim 18, wherein a portion of the D-shaped portion of the plug is received in the piston head and is rotatable with respect to the piston head and wherein the piston head has a first stop that prevents the D-shaped portion from being rotated beyond a first point in a first direction and a second stop that prevents the D-shaped portion from being rotated beyond a second point in a second direction.

* * * * *